Nov. 22, 1955    H. HARDINGE    2,724,506
SEDIMENT AND AGITATING APPARATUS AND THE LIKE
Filed Feb. 17, 1951    3 Sheets-Sheet 1

INVENTOR
HARLOWE HARDINGE
BY
ATTORNEY

Nov. 22, 1955 H. HARDINGE 2,724,506
SEDIMENT AND AGITATING APPARATUS AND THE LIKE
Filed Feb. 17, 1951 3 Sheets-Sheet 2

INVENTOR
HARLOWE HARDINGE

BY

ATTORNEY

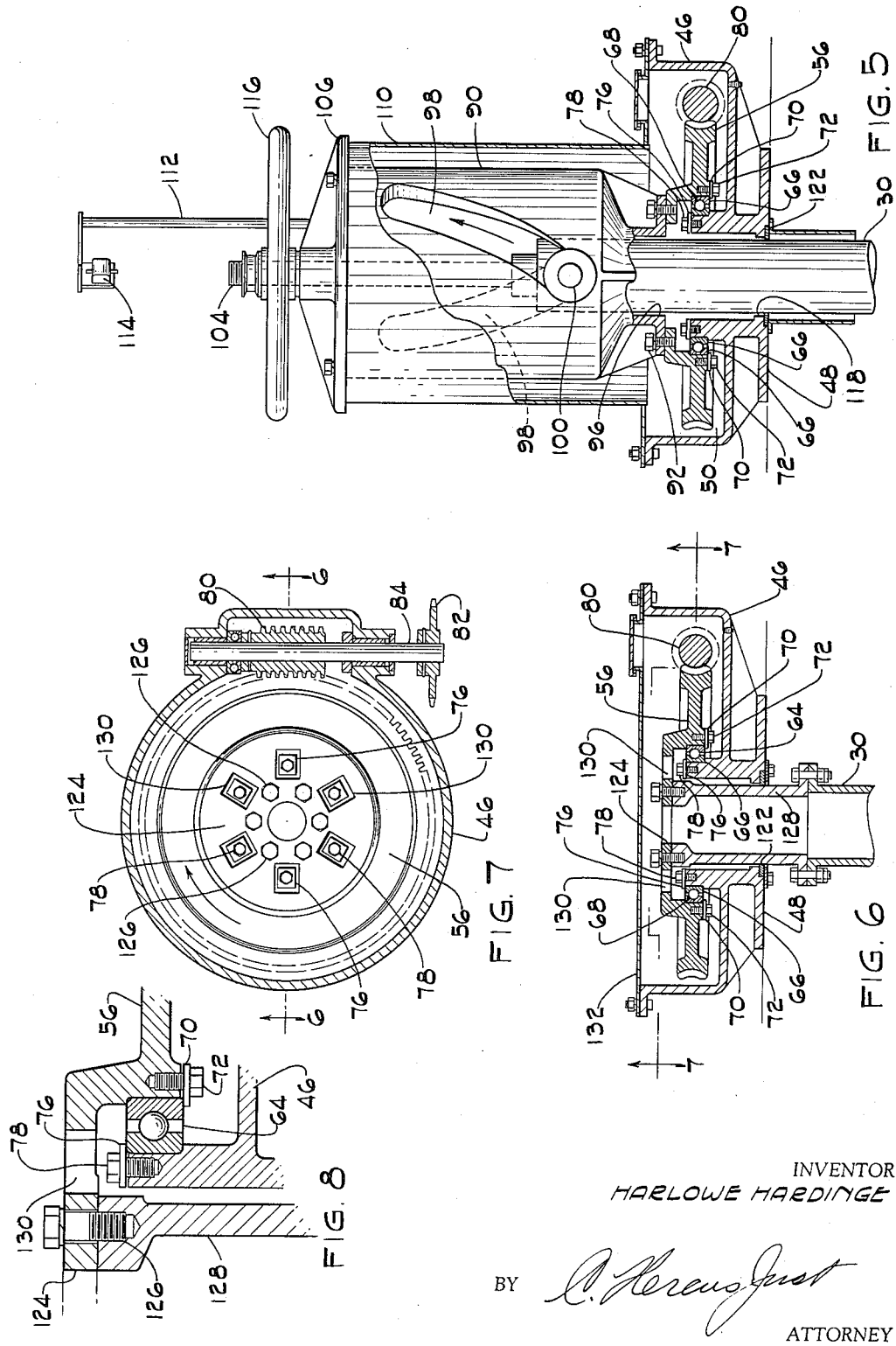

United States Patent Office 2,724,506
Patented Nov. 22, 1955

2,724,506

SEDIMENT AND AGITATING APPARATUS
AND THE LIKE

Harlowe Hardinge, York, Pa., assignor to Hardinge Company, Incorporated, York, Pa., a corporation of New York Application February 17, 1951, Serial No. 211,519

9 Claims. (Cl. 210—55)

This invention relates to sediment handling and agitating devices of the class including thickeners, clarifiers, and the like in which a torque tube or shaft is disposed vertically in a tank, the shaft being suspended from its upper end and rotated by a driving mechanism. Material engaging means such as rakes or scrapers are carried by the torque shaft for purposes of engaging matter within the tank and, for example, moving it to an exit port in the bottom of the tank. More particularly, the present invention pertains to driving mechanisms employed in such devices. For convenience, these devices are referred to hereinafter as sediment handling devices but it is to be understood that said term is used generically to include generally devices of the nature referred to above.

In sediment handling devices presently used, it has been customary practice to drive the torque tube or shaft by mechanism supported in the upper portion of a tank, whereby the torque shaft depends from and is supported by said driving mechanism. The sediment engaging means on the torque shaft imposes very high torque forces on the shaft while the shaft is being driven so as to move the sediment engaging means relative to the tank. To facilitate the rotation of the torque shaft, the supporting and driving mechanism has heretofore usually included a worm or other type of driving gear and in some instances is supported by a simple thrust bearing capable only of sustaining a load imposed in a downward vertical direction. If an abnormal mass of sediment or obstruction is encountered by the sediment engaging means on the torque shaft while moving said sediment engaging means within the tank, tilting or canting of the torque shaft usually results and causes the driving gear to be tipped from or disaligned relative to its normal horizontal position on its bearing support at the upper end of the torque shaft. As aforesaid, the anti-friction bearings generally used at present are the simple type which only sustain a vertical load imposed in a downward direction and of themselves are not capable of maintaining the driving gear in its normally horizontal operative position as when one side of the sediment engaging means tends to rise from its normal path. That is, the bearings cannot of themselves prevent tipping of the gear from its normally horizontal operative position as when the aforementioned tilting or canting of the torque shaft occurs. When the latter occurs, one edge of the driving gear is raised from engagement with the anti-friction members of the bearings and a greater load is thereby sustained by the anti-friction members engaged by the opposite edge of the driving gear.

One construction now used to maintain the driving gear in its normally substantially horizontal position and in engagement with the anti-friction bearing includes an annular plate or cover member disposed over and in slightly spaced relation to the upper surface of the driving gear in such a manner that when tilting or canting of the torque shaft tends to displace the driving gear from its normal horizontal position, the tipped portion of the gear slidably and frictionally engages said plate or cover member and thereby resists movement of the gear from said position. Such means for resisting displacement of the gear, however create substantial friction and thus impose an additional load on the driving means for the gear which driving means is already under abnormal load due to the movement of the material engaging means on the torque shaft being impeded by engagement of said means with an abnormal mass or obstruction. Other means now used to avoid such misalignment of the driving gear are more costly and complicated as well as being inaccurate and still permit more tilting or cocking of the driving gear than is desirable or efficient.

It has also been customary practice in this art to provide various arrangements for elevating the torque shaft and the sediment engaging means thereon when the latter sustains increased resistance by encountering an abnormal mass or obstruction while engaging and moving sediment or other material in the tank. Upon such increased and abnormal resistance being encountered, mechanism is caused to operate either manually or automatically whereby the torque shaft and the sediment engaging means thereon are elevated in the tank until the sediment engaging means is freed from the obstruction or abnormal mass in order not to damage or disrupt the driving mechanism or the power means energizing the same. The arrangements presently used for elevating the torque shaft and sediment engaging means are in general costly and awkward in operation and have also necessitated in some instances the use of additional power means for effecting elevation of the torque shaft and the sediment engaging means thereon.

The present invention provides means to overcome the disadvantages inherent to presently used devices of the nature such as described above.

It is an object of the present invention to provide improved rotatable supporting and driving means for a torque shaft in a sediment handling device of the type described, said means including an anti-friction bearing assembly and simple and effective mounting means of novel design therefor, whereby the novelly mounted anti-friction bearing assembly in and of itself maintains the driving gear in its normal, operative position without requiring the use of auxilliary means of any kind for maintaining such alignment; moreover obviating the increased load, such as is developed in presently used gear aligning devices employing sliding friction means, as occurs when the sediment engaging means on the torque shaft encounters an abnormal mass or obstruction in the tank and thereby tends to cant or tilt the torque shaft.

It is another object of the invention to provide improved and simplified mechanism operable automatically to raise or elevate the torque shaft and sediment engaging means when abnormal torque is imposed upon the shaft such as when the sediment engaging means encounters an abnormal mass or obstruction while being moved in the bank.

It is still another object of the invention to provide a simple and novel anti-friction bearing assembly and mounting means which rotatably supports the driving gear and torque shaft depending therefrom, combined with an improved and simplified mechanism for automatically raising and guiding the torque shaft relative to the gear and tank when an abnormal mass or obstruction is encountered by the sediment engaging means on the shaft, the anti-friction nature of the bearing assembly and mounting which supports the driving gear facilitating the operation of the mechanism for elevating or raising the shaft as aforesaid.

It is a further object of the invention to provide a bearing assembly and mounting means therefor to connect the races thereof to a driving gear and a fixed support, the same having far greater accuracy and preciseness than in presently used bearing means, whereby bearing assemblies of materially smaller diameters may be used to effect even greater efficiency and more desirable results than bearings of far greater diameters used at present in similar sediment handling devices; said greater accuracy and preciseness, coupled with improved and novel clamping means for the bearing races, also resulting in easier installation than has heretofore been possible and a minimum of cocking or tilting of the driving gear and the torque shaft depending therefrom.

Details of the foregoing objects and of the invention as well as other objects thereof are set forth in the following specification and illustrated in the accompanying drawings forming a part thereof.

In the drawings:

Fig. 5 is a vertical sectional view similar to Fig. 3 but the section being taken in a plane shifted 90° about the vertical axis of the mechanism to illustrate certain details of said mechanism.

Fig. 6 is a vertical sectional view, taken on the line 6—6 of Fig. 7, of another embodiment of driving mechanism for the scraper assembly of the device illustrated in Figs. 1 and 2, said driving mechanism embodying no means for elevating the scraper assembly.

Fig. 7 is a sectional plan view of the mechanism shown in Fig. 6, taken substantially on the line 7—7 thereof.

Fig. 8 is an enlarged fragmentary sectional view showing details of mounting the bearing assembly of the invention.

Figure 1:
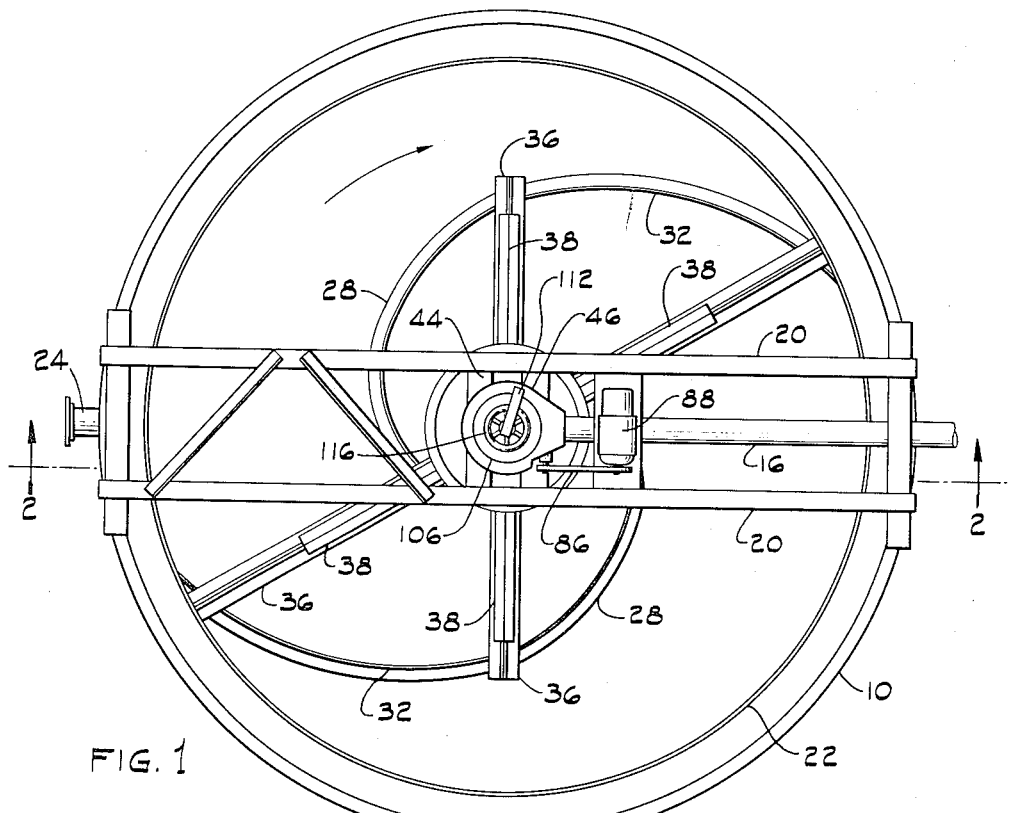
Fig. 1 is a top plan view of an exemplary sediment handling device embodying the principles of the present invention.
Figure 2:
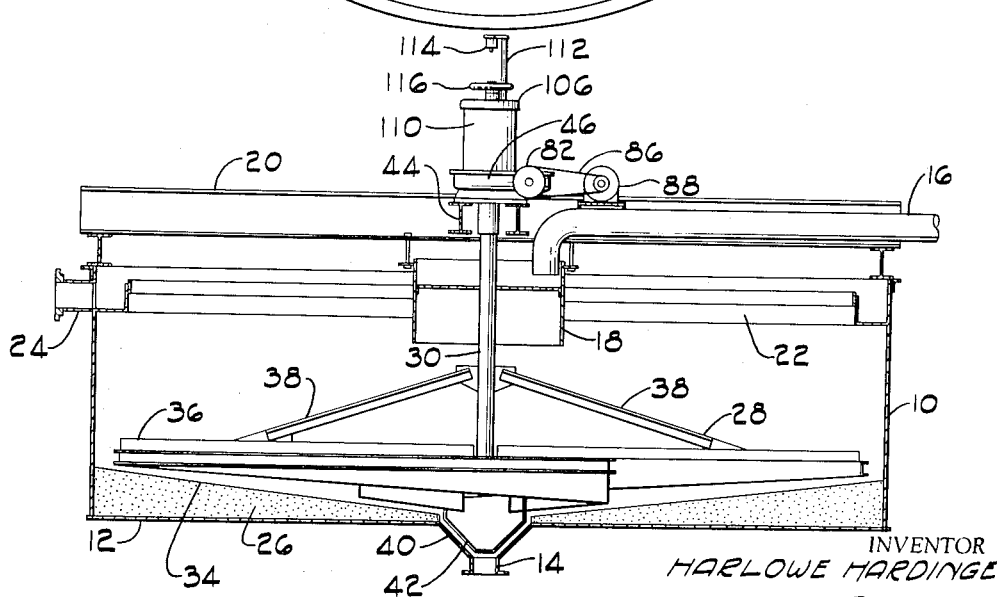
Fig. 2 is a vertical sectional view of the device shown in Fig. 1, taken on the line 2—2 thereof.

Referring to the drawings and particularly Figs. 1 and 2, an exemplary sediment handling device is illustrated therein comprising a thickener but it is to be understood that the principles of the present invention may be embodied in other sediment handling devices such as clarifiers, agitators and the like in which drivnig mechanism for the scraper assembly is required as hereinafter described. In the exemplary illustration, a tank 10 is shown which may be constructed from sheet metal, concrete, or any other suitable material in accordance with conventional practice. The tank has a bottom 12 having a central discharge port 14 through which settled material or sludge is removed from the tank 10.

Fluid such as water containing entrained material which is to be removed therefrom by sedimentary action is introduced into the tank through a feed line 16, the discharge end of the feed line being positioned within the feed well 18 supported within the tank 10 by suitable structure such as beams 20 extending across the top of the tank. Positioned adjacent the inner periphery of the upper edge of the tank 10 is an overflow weir-top tray 22 which is annular and is provided with an overflow conduit 24. In accordance with customary practice, fluid or liquid from which particles are to be removed is discharged into the tank through the feed line 16 and the size of the tank is designed relative to the rate of feed and also relative to the quantity of entrained particles and the settling rate thereof so that the liquid from which particles are separated by settling will remain in the tank 10 a sufficient period to permit the desired amount of settling to take place. The settled particles settle to the bottom 12 of the tank as sludge and build up a bed 26.

A scraper assembly generally indicated 28 is rotatably supported within the tank 10 by means comprising the present invention. In the present exemplary illustration, the scraper assembly comprises a torque shaft 30 having sediment engaging means thereon comprising a plurality of scraper blades 32. In the present illustration, these scrapers are spiral in plane view as clearly shown in Fig. 1. The lower edge of the scraper blades are shaped so that, upon rotation, a relatively flat conical surface 34 is formed at the top of the bed 26. The scraper blades are fixed to and supported by one or more horizontal beams 36 fixed to the lower end of the torque shaft 30 said beams being suitably braced by members 38 which are fixed to the torque shaft and horizontal beams as clearly illustrated in Figs. 1 and 2. Other types of scrapers such as a series of cut-flight scrapers spaced along the beams in well-known fashion may be used.

In the present illustration, the bottom 12 of the tank 10 and the discharge port 14 are connected by a discharge cone 40 and a scraper blade 42 for said cone depends from the lower end of torque shaft 30. It will thus be seen that after the bed 26 is formed in the tank, particles thereafter settling upon the surface 34 of the bed will be engaged by the scraper blades 32 as rotated by the torque shaft 30 and the conical formation of the blades gradually moves the settled particles toward the center of the bottom of the tank and through the discharge port 14. The sludge discharged in this manner is handled in any appropriate way and the liquid from which such sludge has been removed by sedimentation flows over the upper edge of the overflow weir-top tray 22 and through the overflow conduit 24.

Where the device is used as a thickener or clarifier the rotation of the scraper assembly is relatively slow so as not to create appreciable turbulence within the fluid in the tank from which particles are settling. Also, installations of this nature are frequently of large size and diameters of tanks exceeding 100 feet are not uncommon. The scraper assembly provided for removing the settled sludge from the tank must of course be substantially as long as the diameter of the tank and it will therefore be seen that very high torque forces are imposed upon the torque shaft 30 which drives the scraper assembly. In many installations the scraper assembly and torque shaft are supported entirely from structure extending across the top of the tank such as the herein illustrated beams 20. In other installations, a central pier or column extends upward from the bottom of the tank and either solely supports a cylindrical torque tube from the top of the pier or column or said pier or column may be connected to cross beams at the top of the tank so as to at least partially support said beams which, in turn, support the rake or scraper driving means. Even in such other installations, the torque shaft or tube is supported solely from the upper end thereof. Thus, the entire weight of the scraper assembly and the torque tube or shaft is generally supported at the upper end of the torque shaft or tube by suitable means which also drive the same. Illustrated herein are several embodiments of improved supporting and driving means shown in detail respectively in Figs. 3 through 5 and Figs. 6 and 7.

Figure 4:
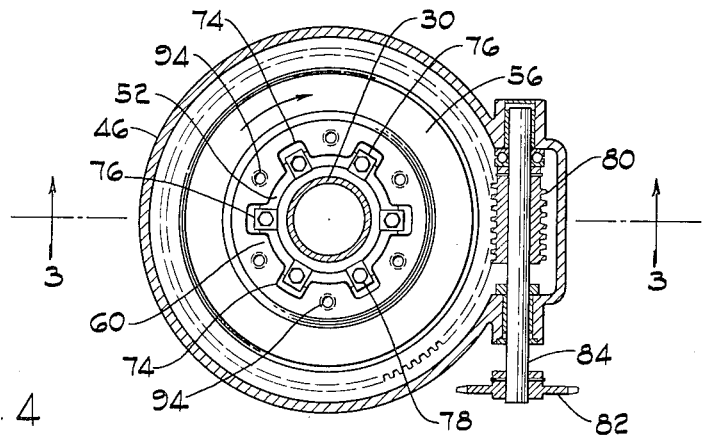
Fig. 4 is a sectional plan view of the mechanism shown in Fig. 3, taken substantially on the line 4—4 thereof.
Figure 3:
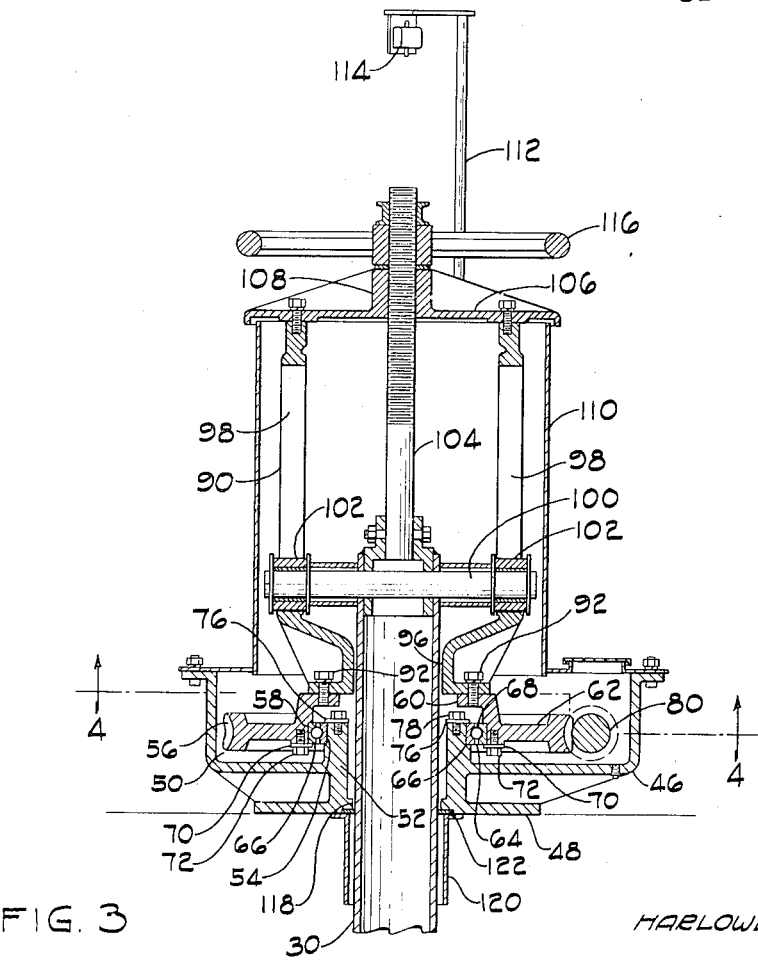
Fig. 3 is a vertical sectional view, taken substantially on line 3—3 of Fig. 4, and showing one embodiment of the driving mechanism for the scraper assembly of the sediment handling device shown in Figs. 1 and 2, said driving mechanism also including automatically operable means for elevating the scraper assembly as described hereinafter.

In the embodiment shown in Figs. 3 through 5, the means for rotatably supporting and driving the scraper assembly is carried by supporting structure such as a pair of cross beams 44 shown in Figs. 1 and 2 which extend between and are fixed to beams 20 extending across the top of the tank 10. A housing 46 is provided with a base 48 that is bolted or otherwise fixed to the cross beams 44, the housing 46 also having a bottom and vertical side walls which form an oil bath 50. The torque shaft 30 which is shown in Figs. 3 and 5 as a hollow tube, extends through an annular collar or boss member 52 which is upstanding from the bottom of the housing 46. The upstanding member 52 is also provided at its upper, outer periphery with an annular bearing seat 54 which opens upward as clearly shown in Figs. 3 and 5.

A driving gear 56, illustrated herein in the form of a worm gear, is rotatably supported within the housing 46, said gear being provided with an annular bearing seat 58 which extends upward from the underface of the gear and is concentric with and laterally spaced outwardly from the bearing seat 54 in the upstanding member 52. The gear 56 is also provided with an annular flange 60 which is offset axially from the plane in which the web 62 of the gear is disposed. The gear 56 is rotatably supported by the upstanding member 52 in the housing 46 through the medium of a combination thrust and radial type anti-friction bearing assembly 64 comprising a pair of concentric races 66 provided with opposed channels or grooves in which anti-friction members such, for example, as balls 68 are disposed so as to permit relative rotation between the races 66 but prevent relative axial movement between said races.

While the present illustration shows a ball bearing assembly, it is to be understood that other types of anti-friction bearing assemblies may be used such as roller bearings including anti-friction rollers disposed between concentric relatively rotatable races constructed so as to prevent relative axial movement between the races. The concentric inner and outer races 66 of the bearing assembly are respectively disposed within the bearing seat 54 in the upstanding member 52 and the bearing seat 58 in the driving gear 56. The races 66 are mounted so that they are substantially vertical and the tolerances between the races and the seats in which they are mounted are preferably close so as to insure accurate and precise seating of the races within said seats.

The bearing assembly 64 is first mounted within the driving gear 56 by positioning the outer race within the seat 58 and clamping the same therein by means comprising a plurality of clamps 70 circumferentially spaced around the rim of the seat 58, said clamps being held in firm clamping engagement with the outer race 66 by bolts 72 threaded into tapped holes provided in the driving gear 56. Such fixing of the outer race of the bearing assembly relative to the driving gear is accomplished of course while the driving gear is removed from the housing 46. The gear is then inverted and placed within the housing so that the inner race 66 of the bearing assembly 64 is seated within the annular seat 54 in the upstanding member 52 with which it precisely conforms. It will be noted however, that the flange 60 of the gear overlies the bearing assembly when the gear is thus mounted and, in order to permit access to the space below the flange 60, said flange is provided with a plurality of circumferentially spaced openings or notches 74. Said notches permit the introduction of a plurality of clamps 76 similar to clamps 70, the clamps 76 engaging the inner race 66 to firmly hold said race within the seat 54 provided in the upstanding member 52. The clamps 76 are secured in operative position by a plurality of bolts 78 which are threaded into tapped holes extending into the upper end of upstanding member 52 until the clamps 76 are tightly clamped against said inner race of the bearing assembly. Such tightening is effected by a wrench inserted through openings 74 in the gear after aligning the openings 74 in the gear with the bolt holes in upstanding member 52.

In the present illustration, it will be noted that the driving gear 56 is actuated by a worm 80 positioned within suitable bearings in the housing 46, said worm and gear 56 operating within the oil bath in said housing. The worm is driven, for example, by a sprocket gear 82 fixed to a shaft 84 to which the worm is also fixed. The sprocket gear 82 is driven by a sprocket chain 86 driven by a power source such as electric motor 88 supported by the beams 20.

From the foregoing, it will be seen that the driving gear 56 is rotatably supported by the bearing assembly 64 for rotation about the axis of the torque shaft 30 and relative to the annular upstanding member 52 which surrounds the torque shaft. The anti-friction mounting of the gear thus requires a minimum of power to drive the gear 56 and the torque shaft 30 by means hereinafter described. In view of the nature of the bearing assembly and the manner in which the races thereof are fixedly positioned within accurately and precisely formed seats in the gear and the upstanding member 52, substantially no tilting or cocking of the gear or other movement in an axial direction is possible. Thus, as distinguished from prior art devices, no guiding or positioning means need be provided in the driving mechanism of the present invention relative to the driving gear and, not only is the need for such additional guiding or positioning means obviated but the anti-friction characteristics of the bearing support for the gear also facilitate the rotation of the driving gear under conditions where abnormal mass of sediment or an obstruction in the sediment is encountered by the scraper assembly so as to tend to cant or tilt the torque shaft 30 which is supported only at its upper end by means interconnecting it to the driving gear 56 as hereinafter described.

The possibility of using close tolerances in the manufacture of the bearing assembly 64 and the seats 54 and 58 therefore produces greater accuracy in the design of the present invention and thus makes possible the use of smaller diameter bearing assemblies and seats than if less precise bearings and other mounting means therefor were used since the use of less precise bearings and seats would require a considerably greater diameter bearing assembly to achieve satisfactory operation. However, even the use of such greater diameter bearing assemblies does not achieve the benefits of the present invention wherein practically no cocking or tilting of the driving gear relative to its support is possible and the corresponding canting and tilting of the torque shaft which is carried by the driving gear is correspondingly lessened.

In accordance with the present invention, the clamping means for races of the bearing assembly hold the races fixedly and accurately in place in their respective seats and such clamping, coupled with the precision of the bearing assembly, keeps misalignment of the driving gear relative to its support and the worm 80 to a minimum. To even begin to approach this possibility in the past, bearings of extensively larger diameter were used but even at this, the nature of the bearings was such that relative axial movement of unsatisfactory proportions between the relatively rotatable members was possible and additional guiding or positioning means which were slidably engaged by the driving gear were also used in some instances in an effort to keep the driving gear from being misaligned. Such arrangements however created additional friction when the driving gear was cocked or tilted as a result of the sediment engaging means on the torque shaft encountered abnormal masses or obstructions. Achieving the desired results by the present invention required the clamp means for one race of the bearing assembly to be covered by or confined within a member (the driving gear) which moved with the torque shaft relative to a fixed support therefor. Hence, attempts to accomplish the present results in the past were defeated as no solution was evident at the time and the present invention comprises a solution to this problem by providing clamp access openings in the driving gear such as hereinabove described and also improved means of mounting the bearing assembly.

The driving mechanism for the torque shaft 30 also includes shaft elevating means which are operable when abnormal masses or obstructions are engaged by the scraper assembly on the torque shaft. One embodiment which is automatically operable is illustrated in Figs. 3 through 5 and comprises a unitary drive tube 90 which is provided at one end with a flange that is fixed to the driving gear 56 by bolts 92 as clearly shown in Figs. 3 and 5. Said bolts are threaded into tapped holes 94 in said gear, these holes being best illustrated in Fig. 4. Said end of the drive tube 90 is also constricted in the preferred embodiment of the invention to provide a guide bearing 96 for the upper end of the torque shaft 30. The lower end of drive tube 90 which is connected to the driving gear 56 covers the clamp access openings 74 when the drive tube is connected to the gear. Thus, obviously, the torque shaft elevating mechanism must be removed from the gear before access to the bearing race clamps 76 and bolts 78 may be obtained.

The drive tube proper has a diameter materially greater than the guide bearing 96 and opposite walls of said tube are provided with steeply sloping, oppositely inclined cam slots 98 which are shown in Figs. 3 and 5. Fixed to the upper end of torque shaft 30 and extending transversally therethrough is a cross-member comprising a drive shaft 100 preferably having anti-friction rollers 102 on opposite ends thereof. Said rollers are disposed within the cam slots 90 and are maintained by suitable spacers and washers in transverse alignment therewith as viewed in Fig. 3. As is particularly evident from Fig. 5, and as stated above, the cam slots 98 slope steeply upward and, under normal conditions, the force imposed by gravity upon the drive shaft 100 due to the weight of the torque shaft and the scraper assembly depending therefrom maintains the rollers seated within the lower ends of the cam slots 98. When the drive gear 56 is actuated by the worm 80 and the power means 88, the drive tube 90 will be rotated with said drive gear and the torque shaft 30 will be rotated about its vertical axis due to the disposition of the ends of the drive shaft 100 in the lower ends of the cam slots 98.

Should abnormal masses or obstructions be encountered by the scraper assembly so as to tend to impede or stop the rotation thereof, the driving gear 56 will continue to be rotated and likewise the drive tube 90. However, under these circumstances, the continued movement of the drive tube 90 during the slowing or stopping of the rotation of the torque shaft 30 will cause the transverse drive shaft 100 to be cammingly elevated relative to the drive gear and drive tube in view of the sloping walls of the cam slots engaging the rollers 102 on the ends of the drive shaft 100. Such elevation correspondingly raises the torque shaft 30 and the scraper assembly thereon and such raising will continue until either the abnormal masses or obstructions encountered by the scraper assembly and the consequent excessive torques imposed thereupon are overcome or until the motor 88 is stopped by means described below.

The motor 88 may be stopped by one of the following means. A lifting screw 104 is fixedly connected at its lower end to the torque shaft 30 as clearly illustrated in Fig. 3 so as to be rotatable therewith. The upper end of the lifting screw is threaded as shown. Surmounting the upper end of the drive tube 90 is a cover 106 having a centrally apertured boss or bearing sleeve 108 through which the lifting screw slidably extends so as to be guided thereby. The cover 106 is bolted to the drive tube so as to be movable therewith. The drive tube 90 is enclosed by a cylindrical casing 110 fixed to the upper edge of housing 46 as shown in Figs. 3 and 5. Supported by said casing 110 is a vertical rod 112 which carries a switch 114 connected in the power circuit of the motor 88. Said switch is also preferably connected in the circuit of a suitable audible alarm, not shown. Thus, should the torque shaft 30 be moved vertically a sufficient distance to carry the upper end of the lifting screw 104 into engagement with the actuating member of the switch 114, the motor 88 will be stopped and an audible alarm will commence sounding to call attention of the operator to the existing condition. No damage will therefore be encountered by either the driving mechanism or any other parts of the entire mechanism. A manually operable switch may also be connected in the motor circuit and either it or switch 114 may be actuated manually by an operator to stop the motor 88.

Under average circumstances, the torque shaft 30 will only be raised a portion of its possible vertical movement so that the scraper assembly is moved above the abnormal mass or obstruction and the rotation of the assembly continues and the scraper assembly tends to lower itself by gravity to its normal position as continued scraping gradually dissipates the abnormal masses by moving it or an obstruction to the discharge port 14 of the tank. Further, the upper end of the lifting screw is also preferably provided with an internally threaded hand wheel 116 which engages the threaded end of the lifting screw and said screw as well as the torque shaft and scraper assembly may be manually elevated by rotating the hand wheel 116. Said arrangement may also be used to adjust the vertical position of the torque shaft 30 relative to the drive tube 90 and tank 10.

From the foregoing it will be seen that the driving gear 56 may be subjected to substantially no cocking or tilting due to the nature of the bearing assembly and the seats supporting the same. The drive tube 90, being connected to said driving gear by the above described means, is likewise incapable of being cocked or tilted any appreciable amount. Any tilting or canting imposed upon the torque shaft 30, when an abnormal mass is encountered by the scraper assembly thereon will be resisted by: the lower guide bearing 118, fixed relative to the housing 46 and the tank 10; the guide bearing 96 which is fixed relative to the driving gear 56 that in turn is supported so as to resist lateral movement as well as cocking or tilting; and the bearing sleeve 108 through which the lifting screw 104 extends, said bearing sleeve being fixedly interconnected to the driving gear. This guiding arrangement offers considerable stability to the torque shaft to resist canting or tilting and effectively positions and guides the torque shaft while normally operating as well as when being raised or lowered for purposes of permitting the rakes or scrapers thereon to clear obstructions or abnormal masses of sediment. Such positioning and guiding is also of such nature that the shaft elevating structure, comprising cam slots 98 and the horizontal drive shaft 100 operating therein, may operate freely and without binding due to the vertical alignment afforded the torque shaft 30 and lifting screw 104.

A splash guard 120 depending from housing 46 surrounds shaft 30 in slightly spaced relationship thereto and yieldable seal 122 also is provided to wipingly engage shaft 30 and prevent liquid or other extraneous matter in the tank from entering the housing 46 or the means supported thereby. In situations where, for example, a mixture of hard material is in solution in tank 10, the splash guard 120 will prevent the larger particles of material from contacting seal 122 and the latter serves to wipe liquid and fine material from torque shaft 30 as when it is elevated relative to the driving mechanism. Thus, possible binding of the shaft relative to the guide bearing 118 due to matter accumulated on the shaft is obviated. Also, the seal 122 prevents passage of liquid or vapor such as water vapor into the housing 46 wherein it could contaminate the oil bath and produce consequent harmful effects. Further, where the driving mechanism is used in conjunction with a tank, either sealed or otherwise, containing a corrosive mixture, the seal 122 will prevent vapors therefrom either escaping from the tank or entering the housing 46. Under the latter circumstances, the parts of the mechanism which are exposed to the vapors will be formed from or coated with suitable material to resist reaction with the corrosive vapors or mixture.

Another embodiment of driving mechanism is illustrated in Figs. 6 and 7 wherein the bearing assembly for supporting the driving gear is similar to that shown in Figs. 3 through 5 but the structure is otherwise simpler in that no means are provided for elevating the torque shaft 30. The driving gear 56 has a flange 124 which is more extensive than the flange 60 of the gear 56 shown in Figs. 3 and 5. The flange 124 in Figs. 6 and 7 is apertured to receive a plurality of bolts 126 which are threaded into tapped holes provided in the upper end of an interconnecting sleeve 128 that is bolted at its lower end to the upper end of torque shaft 30 as shown in Fig. 6. Thus, the torque shaft 30 is fixedly connected to driving gear 56. The flange 124 is also provided with a plurality of apertures 130, the function of which is similar to the openings 74 illustrated in Figs. 3 through 5 so as to permit access to the bolts 78 for the clamps 76 which secure the inner race 66 to its seat 54 in the upstanding member 52. The housing 46 shown in Figs. 6 and 7 is also covered by a simple flat cover 132. Otherwise, the mounting of the driving gear 56 in the embodiment shown in Figs. 6 and 7 is the same as in the embodiment illustrated in Figs. 3 through 5.

In conclusion, the present invention provides driving mechanism for rotatably supporting the upper end of the torque shaft of a sediment handling device such as thickeners, clarifiers, and the like, one example of said devices being shown and described herein for purposes of illustrating the principles of the invention. The driving mechanism not only supports the torque shaft in a depending manner but the unique mounting of the driving gear is such that it resists cocking or tilting to a far higher degree than any previously or presently used construction and the mounting for the driving gear permits the use of far more precise bearing assemblies than have heretofore been capable of utilization, such bearing assembly being a combination thrust and radial type, and the bearing assembly and the seating and clamping arrangements therefor in and of themselves preventing such cocking or tilting of the driving gear. The ability of the driving gear to resist such cocking or tilting is also imparted to the torque shaft which is either interconnected or directly connected to the driving gear in the several embodiments of the invention illustrated herein. The driving mechanism, in one embodiment of the invention, also includes automatically operable mechanism for elevating the torque shaft and the scraper assembly carried thereby when abnormal masses or obstructions are encountered in the tank of the sediment handling device. The improved bearing assembly and greater preciseness thereof and accuracy of mounting with consequent reduction of play improves the operation of the automatic raising mechanism by reducing play therein and tendency for binding which could occur otherwise with types presently and formerly used. Unique assembly of the driving mechanism is made possible to achieve the desired results and the entire driving mechanism is simpler, more efficient, and far more effective than previously or presently used drive mechanisms in similar devices. Driving forces are also more effectively used for driving purposes rather than for overcoming frictional forces inherent to such prior devices.

While the invention has been shown and illustrated in its several preferred embodiments, and has included certain details, it should be understood that the invention is not to be limited to the precise details herein illustrated and described since the same may be carried out in other ways falling within the scope of the invention as claimed.

I claim:

1. In sediment handling devices including a settling tank, a substantially vertical shaft rotatable in said tank, and material engaging means thereon, the combination with said shaft and tank of supporting means fixed relative to the upper portion of said tank and having an annular member surrounding the axis of said shaft, a driving gear coaxial with and interconnected to the upper portion of said shaft, said gear having an annular portion concentric with and spaced horizontally from said annular member of said supporting means, a combination thrust and radial-type anti-friction bearing assembly comprising two concentric races mounted with their axes substantially vertical and positioned with opposing walls extending substantially vertically, said walls respectively having opposing grooves and anti-friction members disposed within said grooves so as to permit relative rotation between the races and substantially prevent relative axial movement in either direction therebetween, means clamping one of said races to said annular member, and additional means clamping the other race to said annular portion of said gear, whereby said anti-friction bearing of said supporting means rotatably supports said gear and shaft depending therefrom relative to said tank so as to be free from friction and tilting of said shaft relative to said tank is substantially prevented by said bearing assembly while said shaft is rotated within said tank.

2. In sediment handling devices including a settling tank, a substantially vertical shaft rotatable in said tank, and material engaging means thereon, the combination with said shaft and tank of supporting means fixed relative to the upper portion of said tank and having an annular seat surrounding the axis of said shaft, a driving gear coaxial with and interconnected to the upper portion of said shaft, said gear being interconnectable to a source of power and having an annular seat therein concentric with and spaced horizontally from said seat in said supporting means, a combination thrust and radial-type anti-friction bearing assembly comprising rotatable anti-friction members interposed between two concentric races mounted with their axes substantially vertical and said anti-friction members interengaging said races so as to permit relative rotation between said races and substantially prevent relative axial movement between said races in either direction, said races being respectively seated in said aforementioned annular seats, whereby said supporting means rotatably supports said gear and shaft depending therefrom so as to be free from friction, and clamping means engaging and fixedly holding said races respectively in said seats, whereby tilting of said shaft relative to said tank solely is substantially prevented by said bearing assembly while said shaft is rotatably supported within said tank.

3. In sediment handling devices including a settling tank, a substantially vertical shaft extending into said tank, material engaging means on said shaft, and supporting means fixed to the upper portion of said tank and relative to which said shaft is supported for rotation within said tank, the combination therewith of a housing carried by said supporting means and including means projecting upward therein and surrounding said shaft, said projecting means having an annular seat therein opening upward and being concentric with the axis of said shaft, a driving gear interconnectable to a source of power and coaxial with and interconnected to said shaft, said gear having an annular seat therein concentric with and spaced from said seat in said projecting means and opening downward, a combination thrust and radial-type anti-friction bearing assembly comprising anti-friction members interposed between and within opposing grooves in two concentric races mounted with their axes substantially vertical and said anti-friction members interengaging said races so as to permit relative rotation between said races and substantially prevent relative axial movement between said races in either direction, the races of said bearing assembly being respectively seated in said aforementioned annular seats, whereby said supporting means rotatably supports said gear and shaft depending therefrom, and clamping means fixedly holding one race within the seat in said gear and fixedly holding the other race within said seat in said projecting means, whereby tilting of said shaft relative to said tank is substantially prevented by said bearing assembly while said shaft is rotatably supported within said tank.

4. In sediment handling devices including a settling tank, a substantially vertical shaft extending into said tank, material engaging means on said shaft and supporting means fixed to the upper portion of said tank and relative to which said shaft is supported for rotation within said tank, the combination therewith of a housing carried by said supporting means and including means projecting upward therein and surrounding said shaft, said projecting means having an annular seat therein opening upward and being concentric with the axis of said shaft, a driving gear interconnectable to a source of power and coaxial with and interconnected to said shaft, said gear overlying said seat in said projecting means and also having an annular seat extending upward from the undersurface thereof and concentric with and spaced radially outward from said seat in said projecting means, a combination thrust and radial-type anti-friction bearing assembly comprising two substantially vertical and concentric races disposed substantially within a common horizontal plane and having opposed annular grooves within which anti-friction members are disposed to interengage said races so as to permit rotation between said races but substantially prevent relative axial movement therebetween in either direction, said races being respectively seated in said aforementioned annular seats, whereby said supporting means and housing rotatably support said gear and shaft depending therefrom, clamping means fixedly holding the outer race within the seat in said gear, and additional clamping means engaging said projecting means and fixedly holding the inner race within said seat in said projecting means, whereby tilting of said shaft relative to said tank is substantially prevented by said bearing assembly while said shaft is rotatably supported within said tank, said gear also being provided with openings in alignment with and permitting access to the clamping means for said inner race of said bearing assembly.

5. In sedimentation devices and the like having a settling tank, a vertical torque shaft rotatable relative to said tank and provided with sediment engaging means, and supporting structure fixed relative to said tank for operatively supporting within said tank said torque shaft and sediment engaging means; in combination with driving means carried by said supporting structure and operative to rotatably drive said torque shaft and move it vertically upon the sediment engaging means encountering obstruction, said driving means comprising a casing fixed to said supporting structure and having an opening through which said torque shaft extends, said casing being shaped to provide an oil bath, a driving gear interconnectable to a source of power and concentrically surrounding said torque shaft and rotatable within said oil bath in a substantially horizontal plane, an anti-friction bearing assembly comprising a pair of concentric races mounted with their axes substantially vertical and anti-friction members interposed therebetween and interengaging said races so as to be operable to permit relative radial rotation but substantially prevent relative axial movement between said races in either direction, said bearing assembly surrounding said torque shaft means firmly engaging and clamping one of said races to said casing and additional means firmly engaging and clamping the other race to said gear, whereby anti-friction rotation of said torque shaft by said gear is permitted while canting of said shaft is substantially prevented by the anti-friction members of said bearing, and a torque shaft guide and elevating unit fixed to said driving gear and comprising a drive tube fixed at one end thereof to said driving gear and having a pair of oppositely inclined sloping guide ways formed in the walls thereof, and a horizontal cross-member fixed to said shaft and the ends thereof being disposed in said sloping guide ways in said drive tube, whereby rotation of said gear causes rotation of said torque shaft and sediment engaging means and when undue resistance is encountered thereby continued rotation of said driving gear by a power source causes said drive tube on said gear to rotate about the axis of said torque shaft and the sloping guide ways in said tube cammingly elevate said cross-member and the torque shaft until the resistance encountered thereby is overcome, whereupon gravity restores said torque shaft and cross-member to normal operating positions relative to said driving gear and drive tube.

6. In sedimentation devices and the like having a settling tank, a vertical torque shaft rotatable relative to said tank and provided with sediment engaging means, and supporting structure fixed relative to said tank for operatively supporting within said tank said torque shaft and sediment engaging means; in combination with driving means carried by said supporting structure and operative to rotatably drive said torque shaft and move it vertically upon the sediment engaging means encountering obstruction, said driving means comprising a casing fixed to said supporting structure and having a guide opening through which said torque shaft extends, a driving gear interconnectable to a source of power and concentrically surrounding said torque shaft and rotatable within said casing in a substantially horizontal plane, an anti-friction bearing assembly comprising a pair of concentric races mounted with their axes substantially vertical and anti-friction members interposed therebetween and interengaging said races so as to permit relative radial rotation but substantially prevent relative axial movement between said races in either direction, said bearing assembly surrounding said torque shaft and one of said races being fixed to said casing and the other to said gear, whereby rotation of said torque shaft by said gear is permitted while canting of said shaft is substantially prevented by said anti-friction members between said races, a unitary drive tube projecting upward from and fixed at the lower end thereof to said driving gear so as to be supported directly thereby, said lower end of said tube being spaced above said guide opening of said casing and constricted to comprise a guide bearing for the upper end of said torque shaft and the upper portion of said drive tube having a greater diameter than said lower end and provided in diametrically opposed walls thereof with a pair of oppositely inclined and steeply sloping guide ways, a horizontal cross-member fixed to said torque shaft and the opposite ends of said cross-member being disposed in said guide ways, whereby when undue resistance is encountered by said torque shaft continued rotation of said driving gear by a power source causes said drive tube thereon to rotate about the axis of said torque shaft and the sloping guide ways in said tube cammingly elevate said cross-member and the torque shaft until the resistance encountered thereby is overcome, whereupon gravity restores said torque shaft and cross-member to normal operating positions relative to said driving gear and drive tube.

7. In sediment handling devices including a tank, a shaft rotatable about a vertical axis within said tank and having material engaging means thereon, and supporting means fixed to said tank and relative to which said shaft is rotatably supported from its upper end; the combination therewith of an annular member surrounding said shaft and fixed to said supporting means and provided with an annular seat adjacent its upper end, a driving gear interconnectable to a source of power and concentric with said shaft and interconnected thereto, said gear having an annular seat concentric with and horizontally spaced from said first mentioned seat, a combination thrust and radial type anti-friction bearing comprising horizontally spaced concentric races mounted with their axes substantially vertical and having anti-friction members disposed therebetween and interengaging said races so as to permit relative rotation therebetween and substantially prevent relative axial movement therebetween in either direction, said races being disposed respectively in said seats rotatably to support said shaft and gear relative to said fixed annular member, clamping means respectively secured to said annular member and gear and firmly engaging said races to fixedly hold the same within said seats, whereby cocking or tilting of said gear and shaft relative to said tank is substantially prevented anti-frictionally, and means separably carried by said gear and normally covering said clamping means secured to said annular member, said clamping means being exposed upon removal of said means from said gear.

8. In sediment handling devices including a tank, a vertical shaft rotatable about its axis within said tank, material engaging means carried by said shaft, and supporting means fixed to said tank, in combination therewith of a housing carried by said supporting means, a seat formed in said housing and concentric with said shaft, a drive gear interconnectable to a source of power and concentric with said shaft and having a seat concentric with said seat in said housing and horizontally spaced therefrom, a combination radial and thrust type anti-friction bearing assembly having concentric races respectively and positioned within said seats and anti-friction members disposed between said races and interengaging the same so as to permit relative rotation therebetween and prevent any appreciable axial disengaging movement in either direction or cocking between said races and afford only anti-friction movement of said shaft at all times, clamping means respectively engaging and firmly clamping said races within said seats, shaft driving and elevating means connected to and extending above said gear and interconnected to said shaft, whereby upon actuation of said gear and encountering of an overload by the material engaging means on said shaft said shaft will be elevated axially by said means, said shaft driving and elevating means covering the clamping means for said races, said means also being removable therefrom to expose the clamping means for at least one of said races to permit access thereto an extension fixedly connected to and extending axially above said shaft, a plurality of vertically spaced guide bearings formed in said shaft driving and elevating means above said gear and slidably receiving said shaft and extension thereon, and another guide bearing in said housing below said gear and slidably receiving said shaft and cooperating with said aforementioned guide bearings spaced thereabove to brace the shaft against tilting or canting while being rotated or moved axially.

9. In sedimentation devices and the like having a settling tank, a vertical torque shaft rotatable relative to said tank and provided with sediment engaging means, and supporting structure fixed relative to said tank for operatively supporting within said tank said torque shaft and sediment engaging means; in combination with an extension carried by the upper end of said torque shaft and axial therewith, driving means carried by said supporting structure and operative to rotatably drive said torque shaft and move it vertically upon the sediment engaging means encountering obstruction, said driving means comprising a casing fixed to said supporting structure and having an opening through which said torque shaft extends, said casing being shaped to provide an oil bath, a driving gear interconnectable to a source of power and concentrically surrounding said torque shaft and rotatable within said oil bath in a substantially horizontal plane, an anti-friction bearing assembly comprising a pair of concentric races mounted with their axes substantially vertical and anti-friction members interposed therebetween and constructed and arranged so as to be operable to permit relative radial rotation but substantially prevent relative axial movement between said races in either direction, said bearing assembly surrounding said torque shaft and one of said races being fixed to said casing and the other to said gear, whereby rotation of said torque shaft by said gear is permitted while canting of said shaft is substantially prevented by the anti-friction members of said bearings, and a torque shaft guide and elevating unit fixed to and supported directly by said driving gear and comprising a drive tube fixed at one end thereof to said driving gear, a bearing sleeve supported by the upper end of said torque shaft guide and receiving said torque shaft extension for guiding movement, said torque shaft guide also having a pair of oppositely inclined sloping guide ways formed in the walls thereof, and a horizontal cross-member fixed to said shaft and the ends thereof being disposed in said sloping guide ways in said drive tube, whereby rotation of said gear causes rotation of said torque shaft and sediment engaging means and when undue resistance is encountered thereby continued rotation of said driving gear by a power source causes said drive tube on said gear to rotate about the axis of said torque shaft and the sloping guide ways in said tube cammingly elevate said cross-member and the torque shaft until the resistance encountered thereby is overcome, whereupon gravity restores said torque shaft and cross-member to normal operating positions relative to said driving gear and drive tube.

References Cited in the file of this patent

UNITED STATES PATENTS

| Number | Name | Date |
|---|---|---|
| 1,444,625 | Mason | Feb. 6, 1923 |
| 1,504,309 | Armstrong et al. | Aug. 12, 1924 |
| 1,962,646 | Logue | June 12, 1934 |
| 2,021,304 | Hardinge | Nov. 19, 1935 |
| 2,087,725 | Scott | July 20, 1937 |
| 2,126,884 | Hardinge | Aug. 16, 1938 |
| 2,226,974 | Hardinge | Dec. 31, 1940 |
| 2,253,535 | Weinig | Aug. 26, 1941 |
| 2,265,046 | Sabin | Dec. 2, 1941 |
| 2,286,397 | Weiss et al. | June 16, 1942 |
| 2,291,836 | Scott | Aug. 4, 1942 |
| 2,360,817 | Scott | Oct. 17, 1944 |
| 2,528,051 | Graner | Oct. 31, 1950 |
| 2,588,115 | Hines | Mar. 4, 1952 |